United States Patent [19]
Boardman

[11] 3,782,204
[45] Jan. 1, 1974

[54] APPARATUS AND METHODS FOR RECORDING ACCELERATION

[75] Inventor: Harry Lynn Boardman, Clayton, Mo.

[73] Assignee: H. L. Boardman Inc., Clayton, Mo.

[22] Filed: July 7, 1971

[21] Appl. No.: 160,311

[52] U.S. Cl. .............................. 73/492, 116/114 AH
[51] Int. Cl. ............................................ G01p 15/04
[58] Field of Search ..................... 73/492, 514, 489; 346/7; 116/114 AH

[56] References Cited
UNITED STATES PATENTS
2,976,732   3/1961   Hautly .................................. 73/492
3,021,813   2/1962   Rips ............................. 116/114 AH FOREIGN PATENTS OR APPLICATIONS
1,145,559   5/1957   France ................................. 73/514

Primary Examiner—James J. Gill
Attorney—Koenig, Senniger, Powers & Leavitt

[57] ABSTRACT

A peak-recording accelerometer including a substantially rigid receptacle with a plurality of interior surfaces and including means for mounting the receptacle for exposure to acceleration. A liner for the receptacle includes panels closely conforming to interior surfaces of the receptacle. The panels are imprintable with a pattern to record acceleration. A resilient mass cooperable with the liner in the receptacle is shaped and dimensioned for fitting, when free of acceleration, in point contact with the panels of the liner. The mass is deformable for uniform increased area contact of its surface with at least one panel of the liner as a continuous function of the mass acceleration. Printing media is positioned between said surface and said liner panel so that the increased area contact imprints on the panel a pattern whose dimensions are a precise predetermined function of the peak acceleration experienced by the mass.

1 Claim, 6 Drawing Figures

PATENTED JAN 1 1974 3,782,204

Harry Lynn Boardman,
Inventor.
Koenig, Senniger,
Powers and Leavitt,
Attorneys.

FIG.4
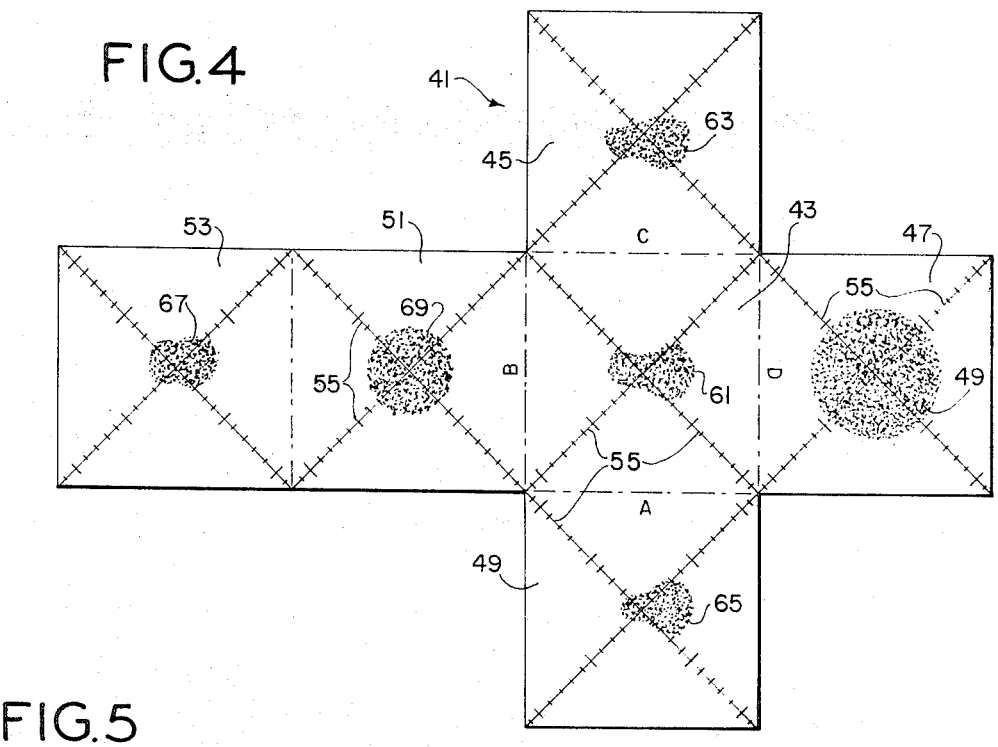
FIG.5
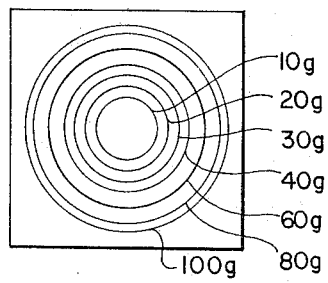
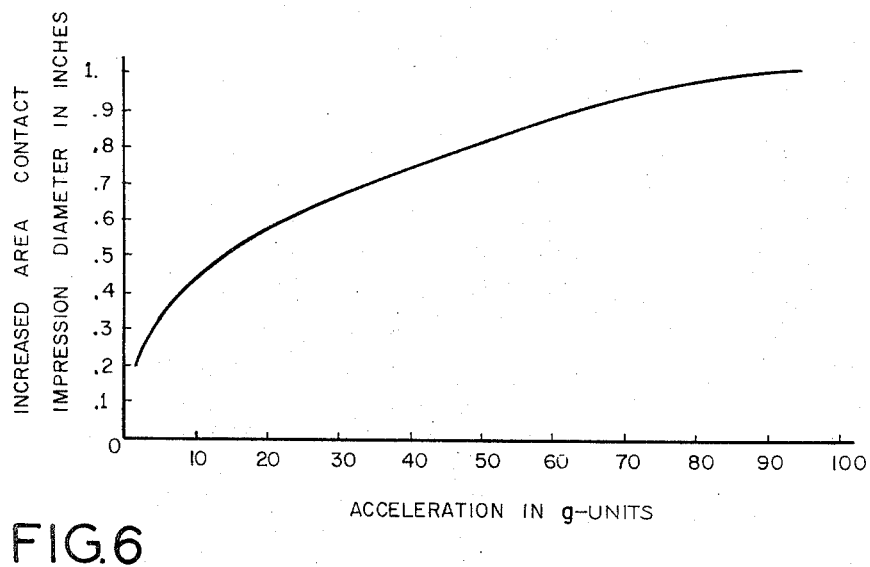
FIG.6

APPARATUS AND METHODS FOR RECORDING ACCELERATION

BACKGROUND OF THE INVENTION

The invention relates to accelerometers and more particularly to a peak-recording accelerometer sensitive to both sustained and shock acceleration and methods of acceleration measurement.

Apparatus and methods of the present invention are particularly concerned with measuring and recording acceleration received by goods in transit as is often desired. It is often important to be able to make a permanent record which shows precisely not only the magnitude but also the direction of the acceleration which the goods have received during shipment.

The prior art includes a number of complex mechanical or electromechanical devices for these purposes. Such devices are often too complex and/or expensive to be practical for use with small shipments or for protecting goods of lesser value. A number of relatively simple devices have been developed for measuring or providing an indicator of either shock or sustained acceleration to which goods have been subjected. However, such devices have had certain limitations or disadvantages such as: insensitivity to both sustained and shock-type accelerations; imprecision or incapability of providing a permanent record which shows the precise or exact amount of acceleration received (such recording heretofore being typically a stepwise or incremental indication); incapability of making a permanent indication of the direction of the acceleration; response to acceleration in only one or certain limited directions; and relative complexity or relatively high cost.

French Pat. No. 1,145,559 and the following U.S. Pat. Nos. are illustrative of the prior art: 2,338,732; 2,454,793; 2,601,440; 2,679,819; 2,976,732; 3,071,973; and 3,117,455.

SUMMARY OF THE INVENTION

Among the several objects of the invention may be noted the provision of apparatus and methods for recording peak acceleration; the provision of such an accelerometer which is sensitive to both sustained and shock or impact-type accelerations of very short duration; the provision of such an accelerometer which is highly accurate and which is capable of making a permanent record of precisely the amount of the peak magnitude of acceleration received; the provision of such an accelerometer which is responsive to acceleration in all directions and which provides a permanent indication of the direction of such acceleration; the provision of such an accelerometer which is extremely simple, which is of low-cost construction, and which is long-lasting in use. Other objects and features will be in part apparent and in part pointed out hereinafter.

Briefly, a peak-recording accelerometer of the invention sensitive to both sustained and shock acceleration comprises a substantially rigid receptacle having a plurality of interior surfaces. Means is provided for mounting the receptacle for exposure to acceleration, as on goods for shipment. A replaceable liner for the receptacle has a plurality of panels closely conforming to respective interior surfaces of the receptacle and is adapted for being imprinted with a pattern to record acceleration. A resilient mass is cooperable with the liner in the receptacle, the resilient mass being shaped and dimensioned for fitting in the liner in the receptacle in point contact with the panels of the liner as long as the mass is substantially free of acceleration. The mass is deformable for uniform increased area contact of its surface with at least one panel of the liner as a continuous function of the mass acceleration. Printing media is provided between said surface of the mass and said panel of the liner. Thus, the increased area contact with the liner by the surface of the mass imprints the media in a pattern on said panel of the liner. The dimensions of the pattern are a precise predetermined function of the peak acceleration experienced by the accelerometer.

BRIEF DESCRIPTION OF THE DRAWINGS

FIG. 4 is a plan view of the liner for the receptacle, showing imprints, i.e., impressions, on panels of the liner resulting from exposure to acceleration;

FIG. 5 is a plan view of one of the panels of the liner showing a certain kind of indicia thereon; and FIG. 6 is a graph of the diameter, in inches, of impressions such as depicted in FIG. 4 as a function of the acceleration causing the impression and expressed as multiples of the acceleration of gravity, $g$.

Corresponding reference characters indicate corresponding parts throughout the several views of the drawings.

DESCRIPTION OF THE PREFERRED EMBODIMENT

Figure 1:
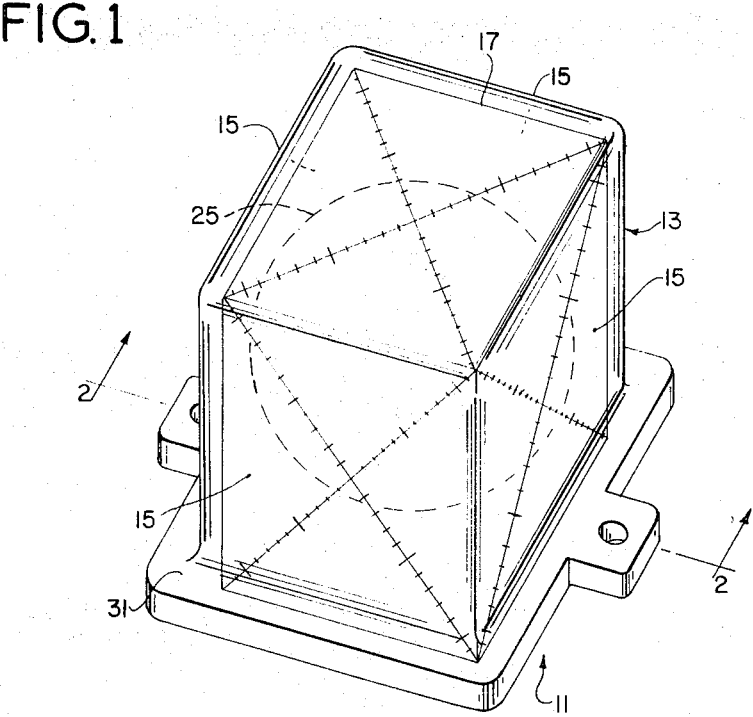
FIG. 1 is an isometric view of a peak-recording accelerometer of the invention.

Referring now to the drawings, an accelerometer of the invention for recording peak levels of acceleration is designated generally 11. The accelerometer includes a rectangular receptacle, generally 13, preferably cast of a synthetic resin material. While various other materials may be employed, a resin of the polycarbonate variety is preferred which provides transparency, high impact strength, dimensional stability and, in general, substantial rigidity. Such rigidity is important in providing accuracy.

Receptacle 13 includes four side walls 15 and a top wall 17 having flat interior surfaces. The four side surfaces are designated 19 and the top surface is designated 21. These surfaces define a cubic chamber 23 for containing a resilient spherical mass 25. Chamber 23 is open at the bottom but adapted to be closed by a thin flat cover plate 27. Plate 27 is square in plan and, when fitted in a shallow recess 29 around the opening of a base 31 of the receptacle and flush with the flat underside of the base, provides a flat interior bottom surface 33 of chamber 23 for retaining sphere 25 within the chamber.

Figure 3:
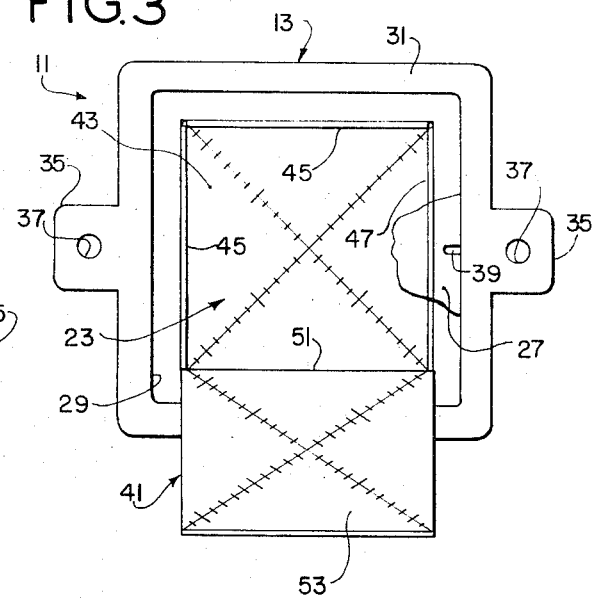
FIG. 3 is a view of the receptacle portion of the FIG. 1 accelerometer in bottom elevation and showing a certain cover plate for the receptacle partly broken away and one panel of a liner for the receptacle folded out.

The base 31 is cast with greater width than the receptacle per se and thus provides a circumferential flange with a relatively large mounting surface. Mounting ears or tabs 35 extend from opposite sides of base 31, each including an aperture 37 for securing the accelerometer to a body such as a shipping container for goods. Preferably, plate 27 is adapted to fit relatively tightly in recess 29 but, in any case, is positively secured in the recess when base 31 is secured to the body whose acceleration is to be recorded. A small notch 39 in one edge of plate 27 facilitates removal of the plate with the aid of a pointed object. In FIG. 3, plate 27 is shown broken away except that portion containing notch 39.

Positioned in chamber 23 is a liner designated generally 41. Liner 41 has six panels each closely conforming to a respective one of the four receptacle side surfaces 19, top surface 21, and bottom surface 33. Each panel is adapted for being imprinted by mass 25 with ink or other printing media with a pattern to record acceleration. Liner 41 is advantageously folded from a relatively thin sheet of translucent polyester film. While other materials can be used, such polyester film offers certain advantages such as being waterproof, longlasting, and having the tendency to remain flat but to permit folding and creasing along fold lines.

FIG. 4 illustrates an unfolded liner 41 including a first square panel 43 and second to fifth square panels 45-51 of the same size as panel 43 integrally joined thereto at fold lines as shown along the four edges of panel 43. A sixth identical panel 53 is integrally joined to panel 51 at a fold line along the edge thereof opposite its juncture with panel 43. The panels are shown imprinted with certain patterns (represented by stippling) which are explained below. Each panel of line 41 is substantially the same size as each of the interior surfaces of enclosure 13. Each of the panels 43-53 of the liner is preferably preprinted with a preferred form of calibration indicia shown in FIG. 4 preferably constituted by a pair of index lines 55,55 intersecting at the middle of the panel. Each line 55 is preferably divided into one-tenth inch increments from which may be determined the dimensions of an imprinted pattern of the type shown in FIG. 4. From the size of the pattern, the peak acceleration experienced by the accelerometer may be determined, as explained later. Panels 45-51 of the liner, which are those panels adapted to conform to the interior side surfaces of the enclosure, may also be printed with appropriate letters A, B, C and D (as shown) corresponding with similar markings such as molded into the enclosure. This permits uniform orientation of the liner when inserted into the receptacle. Another form for the calibration indicia shown in FIG. 5 is a bulls-eye type of pattern which is described later.

For lining receptacle 13, liner 41 is folded along the fold lines and inserted in the receptacle with sphere 25 in contact with the panels, the sphere having been first coated with a printing media. However, sphere 25 is not shown in FIG. 3 in order to illustrate liner panel 43 lying against the top surface 21 of the enclosure, and liner panels 45-51 conforming to the side surfaces 19. Panel 53 is shown folded back out of the enclosure for purposes of illustration. Panel 53 is folded in and in point contact with sphere 25 in actual use. Cover plate 27 is then fitted into recess 29, confining sphere 25 in liner 41. The enclosure may then be secured, as by tabs 37, to the body whose peak acceleration is to be recorded.

Figure 2:
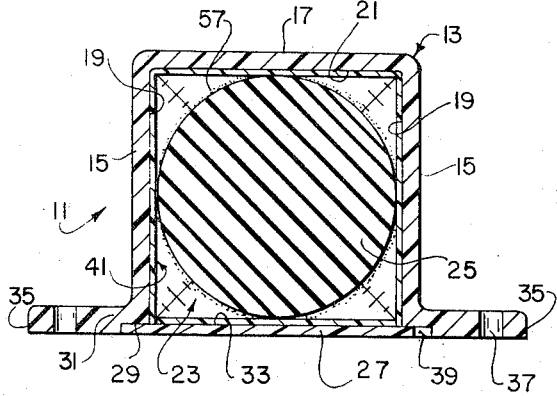
FIG. 2 is a view of the accelerometer in cross section, taken along line 2—2 of FIG. 1.

Sphere 25 is preferably of a homogeneous elastomeric material having a preselected durometer value. A sphere of silicone rubber of substantially 20 durometer hardness has been found useful for recording acceleration up to about 100 g. Sphere 25 is dimensioned for fitting in liner 41 in point contact with the liner panels at the intersection of each pair of index lines 55,55. Such point contact is illustrated in FIG. 2. A sphere 25 of approximately 50-60 durometer may be employed for recording accelerations of more than 100 g. Also, a sphere of considerably less than 20 durometer is useful for recording relatively low levels of acceleration, such as less than 10 g.

As is shown in FIG. 2, sphere 25 is coated with a suitable printing media 57. One such media is finely-powdered molybdenum disulfide. Since such a coating is not a liquid, its useful life is indefinite. Moreover, this powder is easily handled and the sphere is thus readily coated with it. Alternatively, a non-drying ink may be used for the printing media 57 to provide a somewhat darker impression and one which serves as a somewhat more permanent record. Such a non-drying ink may, for example, be constituted by a mixture of castor oil and glycerine having about 20 percent by volume of carbon black added thereto. Other types of printing media may be employed.

When the accelerometer assembled as shown in FIG. 2 is exposed to acceleration, such as that encountered by goods during shipment, sphere 25 deforms according to a known function of the magnitude of acceleration. The surface of sphere 25 comes into uniform increased area contact with at least one panel of liner 41 as a continuous function of the acceleration of the sphere. As a result, the printing media 57 is imprinted on the liner panel in a pattern such as that designated 59 in FIG. 4. Following removal of the liner 41, the dimensions of the pattern are then measured, such as by counting the increments of index lines 55 covered by the printing media.

FIG. 6 illustrates graphically a precise predetermined relationship between the diameter, in inches, of an impression (such as pattern 49 resulting from acceleration normal to panel 47) and the peak acceleration, in multiples of the acceleration of gravity, g, causing the impression. For example, the diameter of a circular panel of 0.86 in. may be correlated by means of the graph to determine that the peak accelerative force encountered by the mass, or sphere, 25 along an axis normal to the panel was about 58 g.

The alternative circular, or bulls-eye, pattern for a liner panel as depicted in FIG. 5 includes circular index rings each of a diameter corresponding to a certain peak acceleration as indicated. The diameter of the rings are preferably determined from the predetermined graphical relationship shown in FIG. 6. Thus the diameter of the circular indicia are already correlated to a known peak acceleration. The diameter of an impression resulting from acceleration may then be quickly compared with the location of the index rings to provide a rapid determination of the peak acceleration encountered.

An important advantage of the present accelerometer in addition to providing accurate measurement of acceleration is that the direction of acceleration causing a pattern to be imprinted on a panel of liner 41 can also be determined. This results because the interior surfaces of the receiptacle, and therefore the panels of liner 41, are at right angles to each other. Accordingly, acceleration in certain directions causes patterns to be concurrently imprinted on a plurality of the liner panels. These patterns are distorted according to the relative direction of the accelerative force. Acceleration in a direction normal to one of the panels causes imprinting of a generally circular pattern thereon. However, acceleration in a direction angled with respect to the normal, i.e., a line perpendicular to a panel, causes imprinting of an elongated pattern on the liner panel.

Such elongated imprints or patterns are shown in FIG. 4. For example, panels 43, 45, 49 and 53 show patterns designated 61–67 which are tear-drop in shape. These patterns suggest that sphere 25 was subject to acceleration in direction toward and normal to panel 49. Panel 29 has a circular pattern whose diameter may therefore be measured to determine the peak acceleration. A smaller circular pattern 69 on panel 51 represents deformation of sphere 25 resulting from rebound from panel 47. It is apparent that other combinations of patterns will result from accelerative forces at angles to the panels and such patterns can similarly be interpreted to determine the direction and magnitude of acceleration.

It may be noted that, because enclosure 13 is transparent and liner 41 is translucent, an imprint resulting from acceleration (such as received during shipment) can be seen as a darkened area through the wall of the enclosure without removal of the liner. The liner may then be removed and the dimensions of the impression or impressions accurately correlated with a graph like that of FIG. 6. The liner may then be retained as a permanent record and thus used, for example, as evidence that goods were exposed to certain peak accelerations during shipment.

To illustrate the invention by way of example, accelerometers of the invention have been constructed employing a receptacle 13 cast of "Lexan" polycarbonate resin, a liner 41 of "Mylar" polyester film, and a sphere 25 of silicone rubber of substantially 20 durometer hardness. Sphere 25 was of 1.740 in. diameter, controlled to within ± 0.003 in., having a weight of 47 grams. Accelerometers of such construction have been tested by exposure to sustained acclerations ranging from 3 g's to 99 g's and by exposure to impact accelerations and to shock-type accelerations varying between 7 and 17 milliseconds in duration. Large numbers of such accelerometers were found to exhibit uniformly accurate response and good correlation between all such types of acceleration.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A peak-recording accelerometer sensitive to both sustained and shock acceleration comprising:

a substantially rigid receptacle having a plurality of interior surfaces;

means for mounting said receptacle for exposure to acceleration;

a liner for said receptacle comprising a plurality of panels closely conforming to respective interior surfaces of said receptacle and each adapted for being imprinted with a pattern to record acceleration, certain of said panels and respective interior surfaces being at right angles to others of said panels and respective interior surfaces such that, on acceleration in certain directions, a plurality of said panels are adapted for being concurrently imprinted with patterns from which the direction of acceleration causing said imprinting can be determined;

a spherical, resilient mass cooperable with said liner in said receptacle, said resilient mass being shaped and dimensioned for fitting in the liner within the receptacle in point contact with the panels of the liner as long as the mass is substantially free of acceleration, said mass being resiliently deformable for uniform increased area contact of the surface of said mass with at least one panel of the liner as a continuous function of the acceleration of said mass;

said receptacle defining a cubic chamber having four interior side surfaces, a top surface, and a bottom surface, said liner comprising a relatively thin sheet of material folded to provide six panels lying against respective ones of said surface, said spherical mass providing point contact with each of said panels, all of said surfaces and panels being substantially identically square;

said receptacle being of generally rectangular shape and comprising a base, including side walls integral with said base and extending upward therefrom to provide said four side surfaces, and a top wall integral with said side walls, and providing said top surface, said base including outwardly extending flange means for securing said base to a body subject to acceleration and having an aperture, said bottom surface being constituted by a plate fitting in said aperture flush with said base whereby when said base is secured to said body, said plate is secured in said aperture; and printing media between said spherical mass and said panels whereby said increased area contact with said liner by said surface imprints said media in a pattern on said one panel of the liner the dimensions of which pattern are a precise predetermined function of the peak acceleration experienced by said accelerometer, and whereby acceleration in a direction normal to one of said panels causes imprinting of a generally circular pattern thereon and acceleration in a direction angled with respect to a line perpendicular to a panel causes imprinting of an elongated pattern thereon.

* * * * *